(No Model.)
A. W. BARTON & G. N. RICH.
TEAM BELL.
No. 269,620. Patented Dec. 26, 1882.
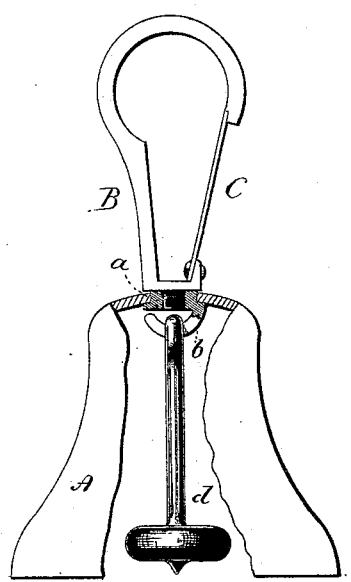
Witnesses.
Abner W. Barton
Geo. N. Rich
Inventors.
By atty.

UNITED STATES PATENT OFFICE.

ABNER W. BARTON AND GEORGE N. RICH, OF EAST HAMPTON, CONNECTICUT, ASSIGNORS TO THE BARTON BELL COMPANY, OF SAME PLACE.

TEAM-BELL.

SPECIFICATION forming part of Letters Patent No. 269,620, dated December 26, 1882.

Application filed September 4, 1882. (No model.)

*To all whom it may concern:*

Be it known that we, ABNER W. BARTON and GEORGE N. RICH, of East Hampton, in the county of Middlesex and State of Connecticut, have invented a new Improvement in Team-Bells; and we do hereby declare the following, when taken in connection with accompanying drawing and the letters of reference marked thereon, to be a full, clear, and exact description of the same, and which said drawing constitutes part of this specification, and represents a sectional side view.

This invention relates to an improvement in the article known in the trade as "team-bells"—that is to say, bells which are provided with means for hanging them upon some part of the harness. Various devices have been made for hanging such bells. Open hooks have been used, which are made a permanent part of the bell; but these are liable to accidental disengagement; they cannot be easily and quickly attached or detached, because the wire hook must be bent to close it for attachment and unclosed in detaching it. This repeated bending of the wire frequently breaks it and destroys the bell for the purpose intended, and from such breaking they are frequently lost, so that the more common construction adopted has been a bell with a loop on its head, through which a strap is introduced, and that strap engaged with the eye of a snap-hook. The snap engaged with some part of the harness avoids the liability of loss; but this construction adds materially to the cost of the bell—in fact, a strap and hook without the bell costs about the same as the bell with an open hook.

The object of our invention is to construct the bells with a snap-hook as a rigid and permanent part of the bell, and in such a bell, as hereinafter described, our invention consists.

A represents the bell, which may be of any of the usual forms. We construct the hook B with a tongue, C, which may be a spring-tongue, as shown, or any of the known snap-hooks. The shank end of the hook is best constructed with a screw-stud, $a$, to pass through the head end of the bell, the shoulder around the stud resting upon the surface of the bell, while the screw-stud engages a loop, $b$, which carries the hammer $d$. The loop $b$ taking a bearing upon the inside of the bell, the bell is clamped between the shoulder of the hook and the loop, so as to be firmly held.

Instead of making the stud $a$ screw-threaded, it may be plain, to pass through the loop and be riveted down; or the shank end of the hook may be tapped and a stud formed on the loop which carries the hammer; or the shank of the hook may pass through the bell and form the loop, with a nut on the shank to clamp the bell to the hook. We therefore, while preferring the construction shown in the accompanying illustration, do not wish to be understood as confining our invention to the particular method of securing the hook to the bell, it only being essential to our invention that the hook and bell shall be constructed so that the hook may be made a permanent part of the bell.

We claim—

1. The herein-described team-bell, consisting of the bell with a snap-hook rigidly attached to its head end, substantially as described.

2. The combination of the bell A, snap-hook B, a device, substantially such as described, to secure the hook to the bell, and a tongue within the bell, hung to said securing device, substantially as described.

ABNER W. BARTON.
GEORGE N. RICH.

Witnesses:
H. D. CHAPMAN,
NATHL. C. SMITH.